Jan. 21, 1964   C. E. TIBBALS   3,118,804
APPARATUS FOR MAKING PARQUET FLOORING BLOCKS
Filed May 6, 1957   9 Sheets-Sheet 1
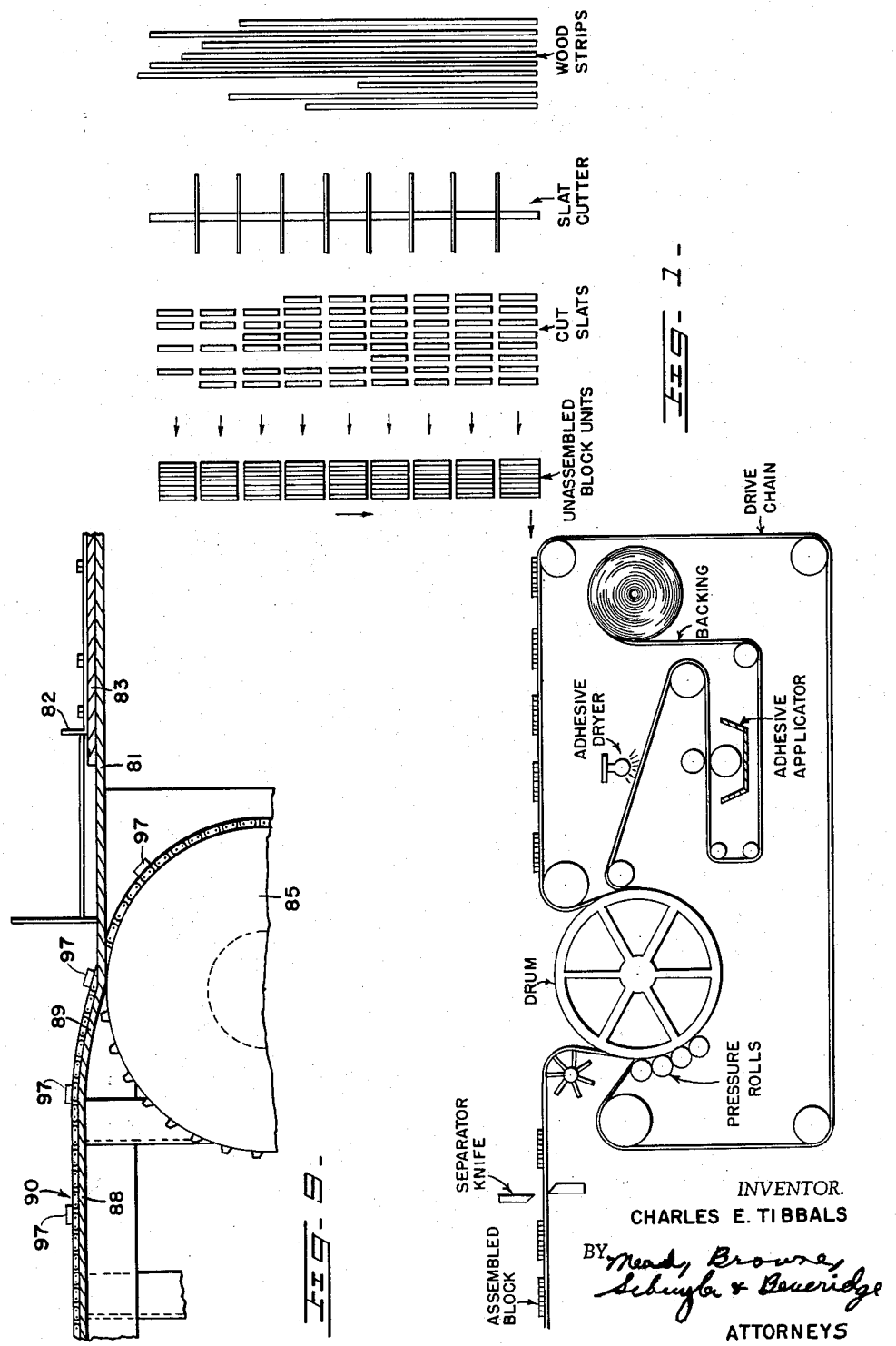
INVENTOR.
CHARLES E. TIBBALS
ATTORNEYS

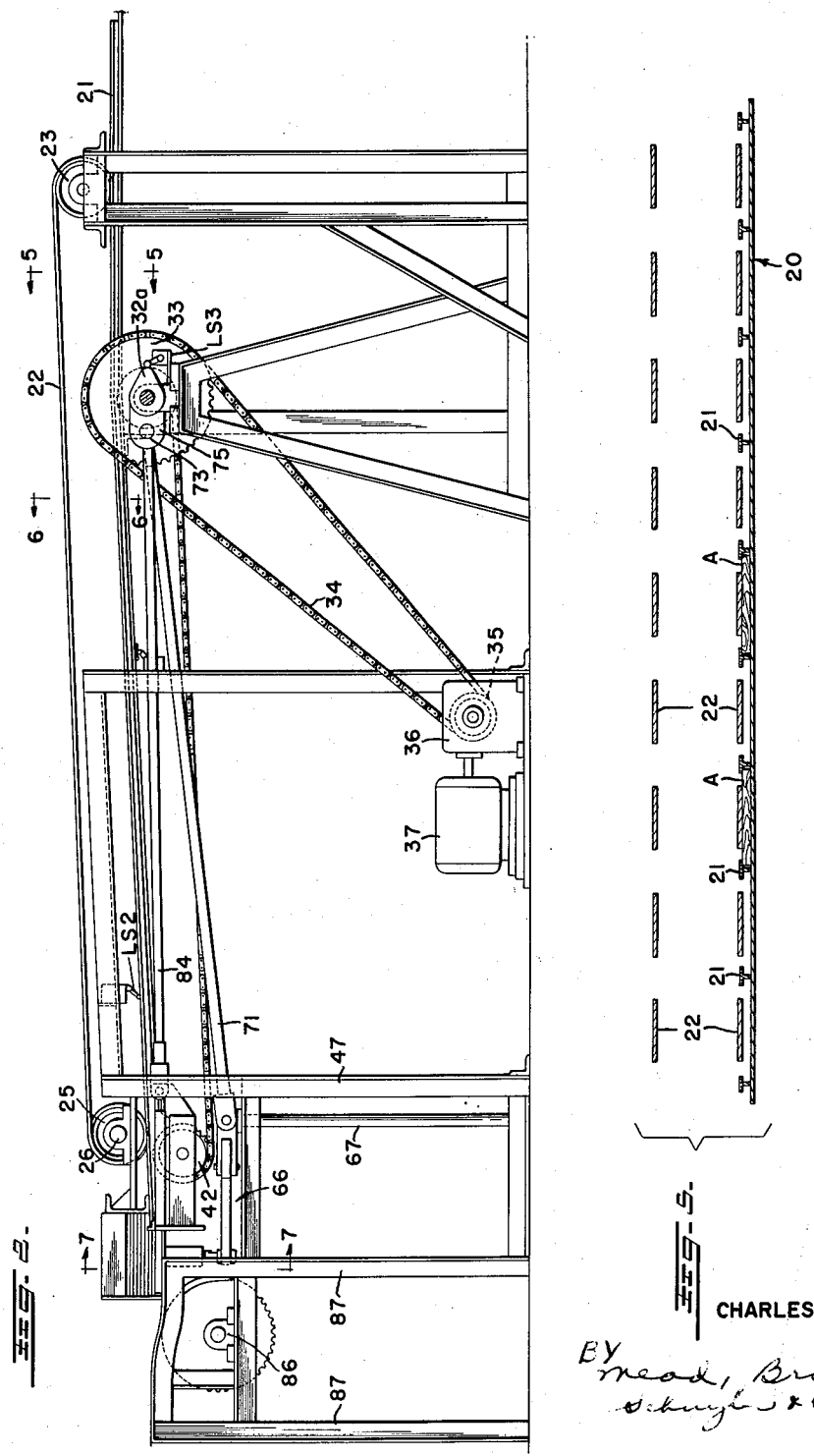

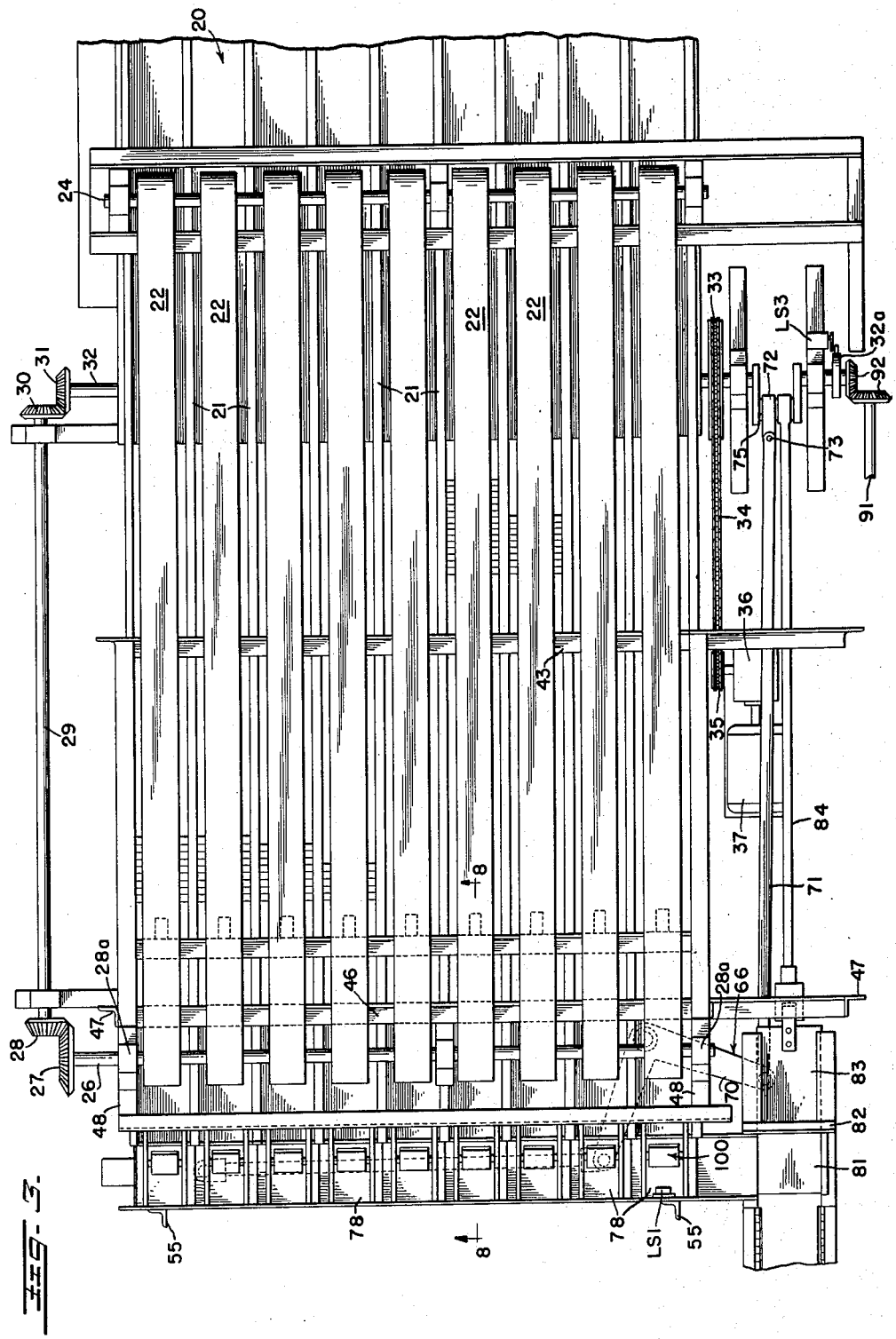

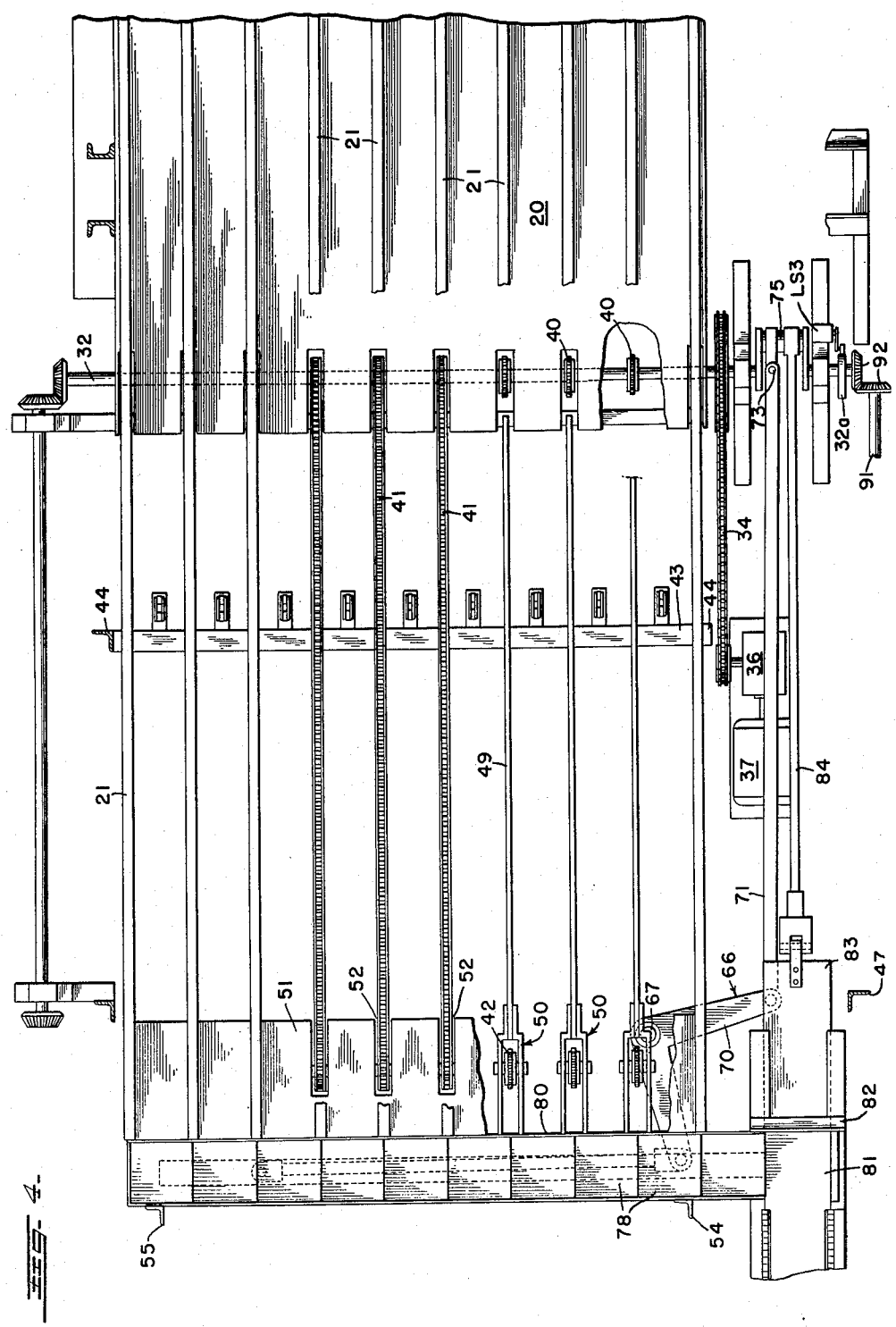

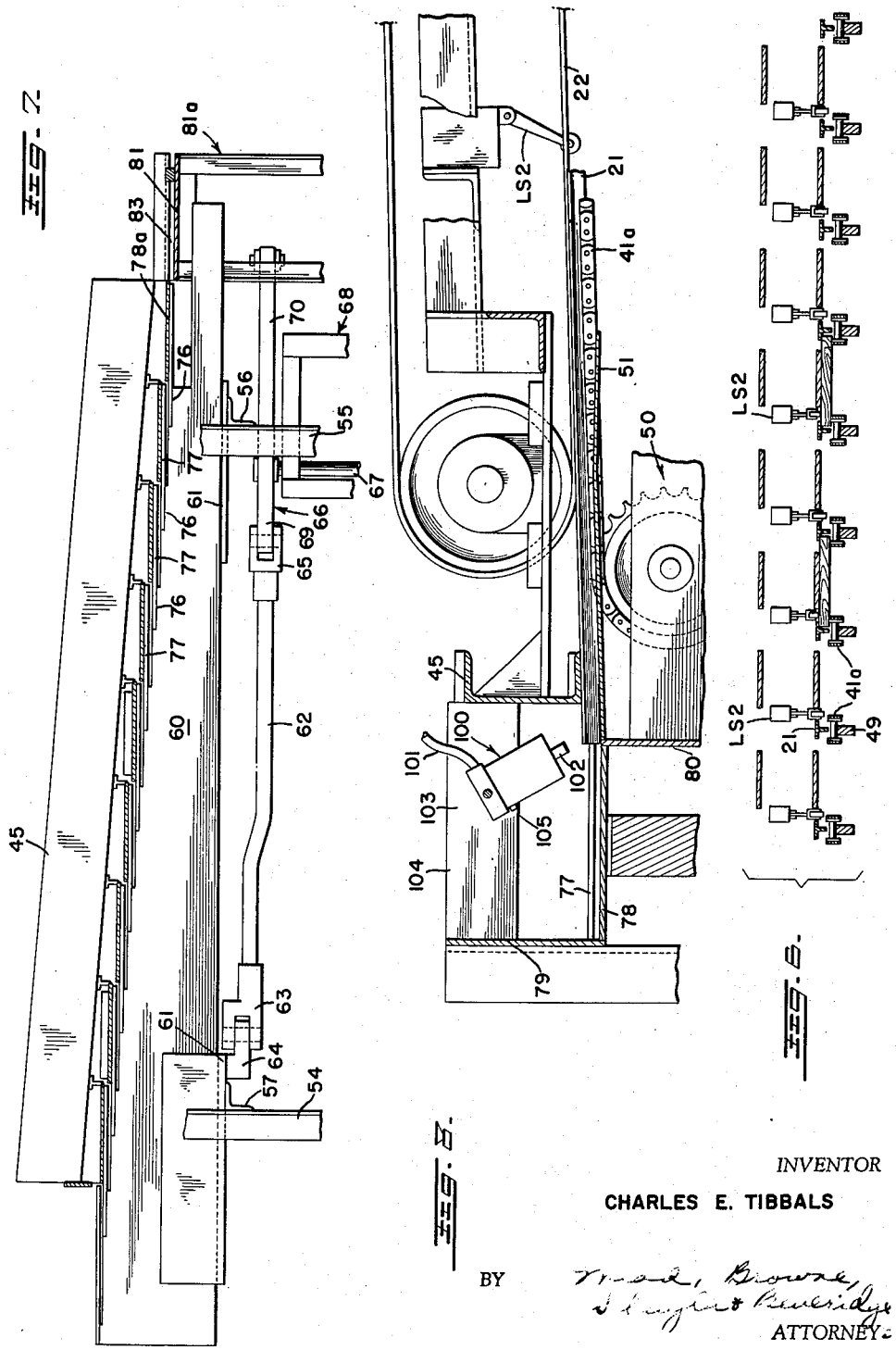

Jan. 21, 1964         C. E. TIBBALS         3,118,804
APPARATUS FOR MAKING PARQUET FLOORING BLOCKS
Filed May 6, 1957                    9 Sheets-Sheet 6
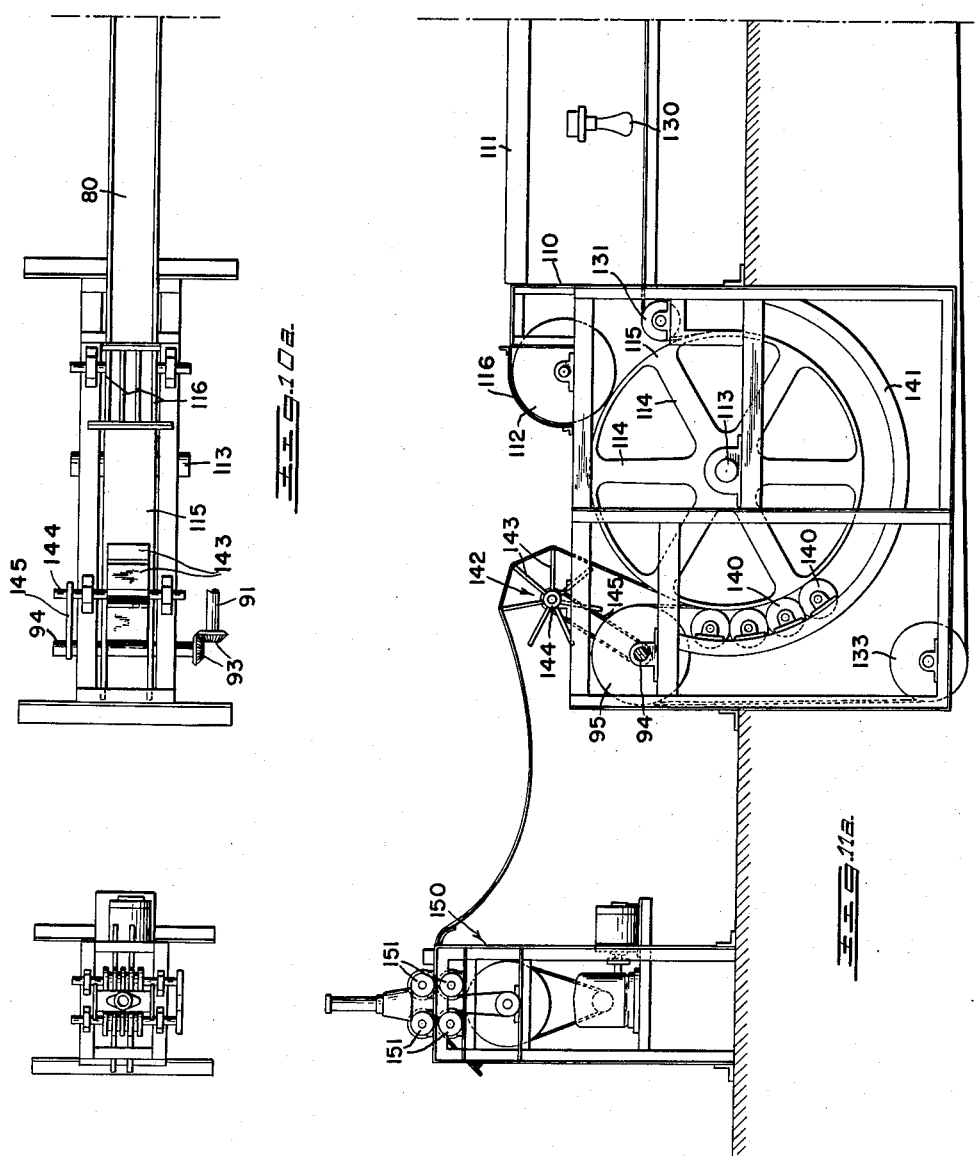
INVENTOR
CHARLES E. TIBBALS
BY
ATTORNEY

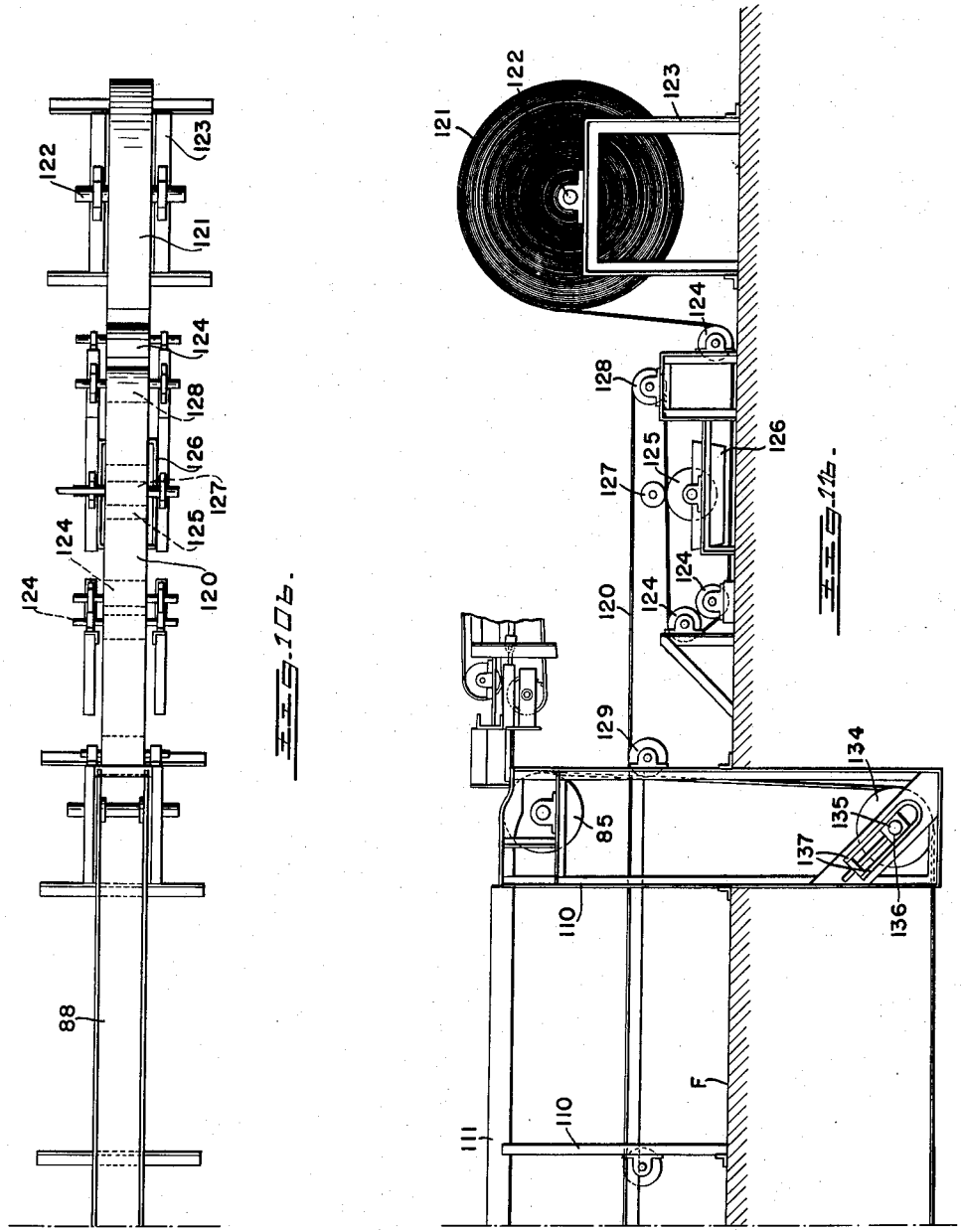

Jan. 21, 1964     C. E. TIBBALS     3,118,804
APPARATUS FOR MAKING PARQUET FLOORING BLOCKS
Filed May 6, 1957     9 Sheets-Sheet 8

INVENTOR
CHARLES E. TIBBALS

BY Mead, Browne,
Schuyler & Beveridge
ATTORNEY

Jan. 21, 1964 C. E. TIBBALS 3,118,804
APPARATUS FOR MAKING PARQUET FLOORING BLOCKS
Filed May 6, 1957 9 Sheets-Sheet 9
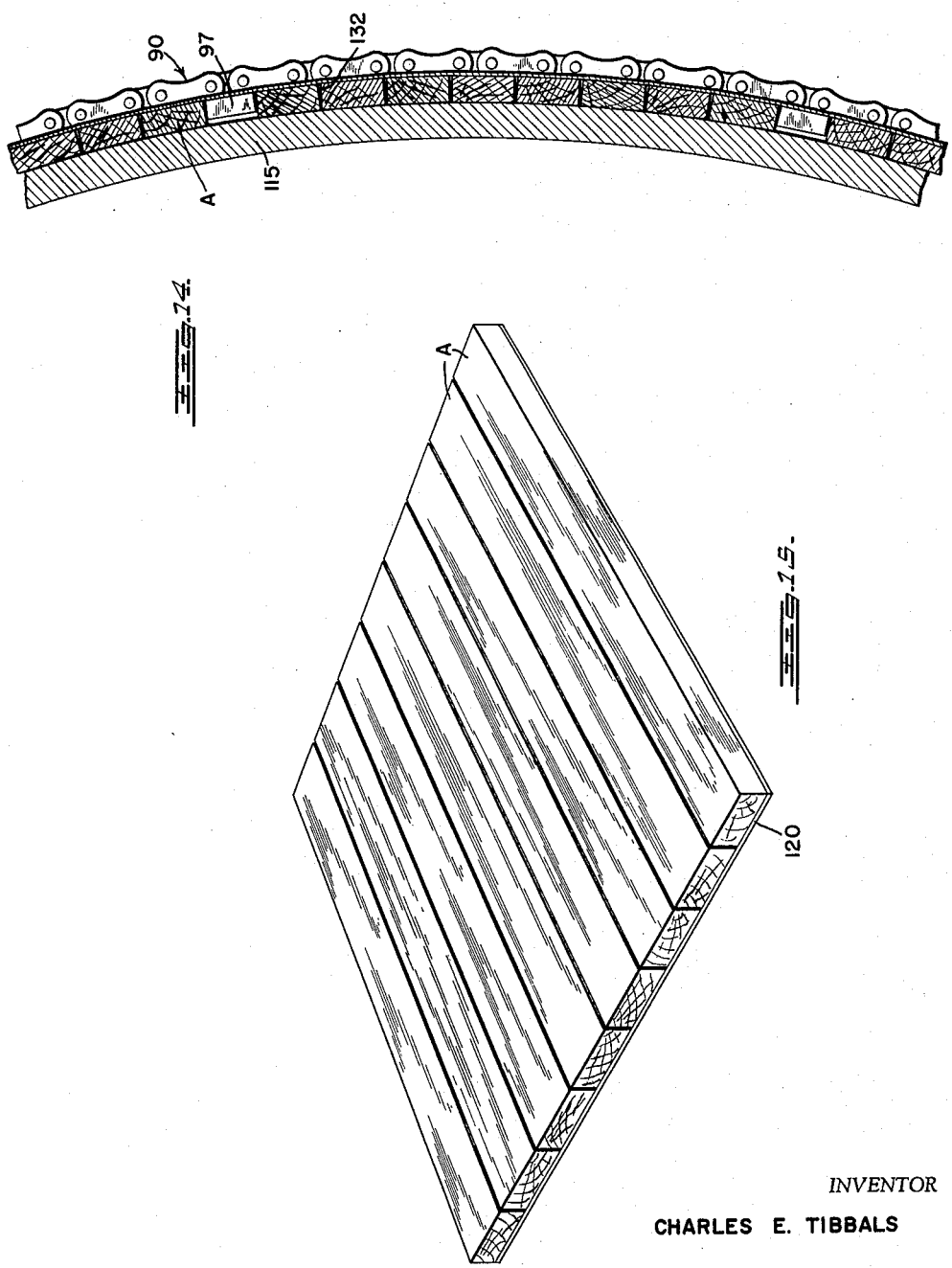
INVENTOR
CHARLES E. TIBBALS
BY
ATTORNEYS

# United States Patent Office 3,118,804
Patented Jan. 21, 1964

1

3,118,804
APPARATUS FOR MAKING PARQUET
FLOORING BLOCKS
Charles E. Tibbals, Oneida, Tenn., assignor to Wood
Products Development Company, Inc., Oneida, Tenn.,
a corporation of Tennessee
Filed May 6, 1957, Ser. No. 657,184
14 Claims. (Cl. 156—552)

The present invention relates to apparatus for making parquet flooring blocks.

More particularly, this invention proposes means for making parquet flooring units or blocks by compiling formed wooden slats into flooring units and securing the slats into a discrete parquet block. Additionally, the invention relates to an apparatus which includes novel means for conveying, assembling, and securing the block components.

Parquet flooring blocks are formed of individual hardwood strips or slats which are secured together in suitable fashion to form a discrete flooring block, such blocks being utilized subsequently at the construction site for assembly into a complete floor. The particular block of the present invention comprises a plurality of wooden strips or slats which are assembled in edgewise spaced relation and held in assembly by suitable securing means, such as an adhesive backing strip. Such a backing strip may be of any desired type, one preferred strip being a porous paper felt or the like bibulous-web impregnated with a bituminous or asphaltic composition and adhesive secured to the under surface of the block.

The present invention is primarily concerned with apparatus for preparing such a block. The present invention, as distinguished from that disclosed in Tibbals Patent 2,650,627, contemplates the complete manufacture and assembly of the block from a plurality of elongated wooden strips which are cut into slats of the proper size and shape by any suitable means, as by passing the wooden strips through a gang-type saw, preferably of the rotary type. The specific method of forming the slats forms no part of the present invention.

After the slats have been cut, the individual slats are conveyed to a sorter at which the slats are sorted into and retained in unassembled but grouped relation, the slat groups being of such size that the number of slats necessary to form a complete flooring block are maintained separate from the other slats with a suitable securing means, preferably in the form of a continuous web. Inasmuch as the slats for any given block have been previously assembled and retained in an individual group, these slats merely need be adhesively retained in the unit to form a complete discrete parquet block. If necessary, individual blocks are then separated, as by cutting the continuous backing web, and the blocks are now ready for conventional sizing and finishing procedures to form a block suitable for use in flooring.

The apparatus of the present invention includes a novel sorting mechanism for separating a given number of slats from the large body of slats issuing from the cutter. Further, a novel assembly mechanism is provided for placing the slats upon and adhesively securing the slats to the continuous backing web.

Another and an equally important object of this invention is the provision of an improved apparatus for making parquet flooring blocks.

Another object is the provision of an apparatus for compiling a group of slats into a flooring unit and securing the slats to a backing element to retain the slats in an assembled discrete parquet block.

Yet another important object is the provision of an apparatus for making parquet flooring blocks including means for conveying individual flooring slats to a sorting station, means for sorting the slats into unassembled block units, means for transferring block units to an assembly station, conveyor means for conveying block units to and through the assembly station, and means for positioning the block units in predetermined fashion on a continuous adhesive backing web.

These and other objects will be more apparent from the following detailed description of a preferred embodiment of this invention and by reference to the drawing forming a part thereof, wherein on the drawings:

FIGURE 1 is a schematic representation of a method of and apparatus for making parquet flooring blocks in accordance with the present invention;

FIGURE 2 is an elevational view of a portion of the apparatus of the present invention utilized for conveying slats to a sorting station and of the sorting station per se;

FIGURE 3 is a plan view of that portion of the apparatus shown in FIGURE 2;

FIGURE 4 is a view similar to FIGURE 3, but with parts broken away for clarity of illustration;

FIGURE 5 is a sectional view taken along the plane 5—5 of FIGURE 2;

FIGURE 6 is a sectional view taken along the plane 6—6 of FIGURE 2;

FIGURE 7 is a sectional view taken along the plane 7—7 of FIGURE 2, with parts shown in elevation;

FIGURE 8 is an enlarged sectional view, with parts shown in elevation, taken along the plane 8—8 of FIGURE 3;

FIGURE 9 is an enlarged fragmentary sectional view illustrating the transfer of unassembled flooring units from the sorting station to an assembly station;

Figure 12:
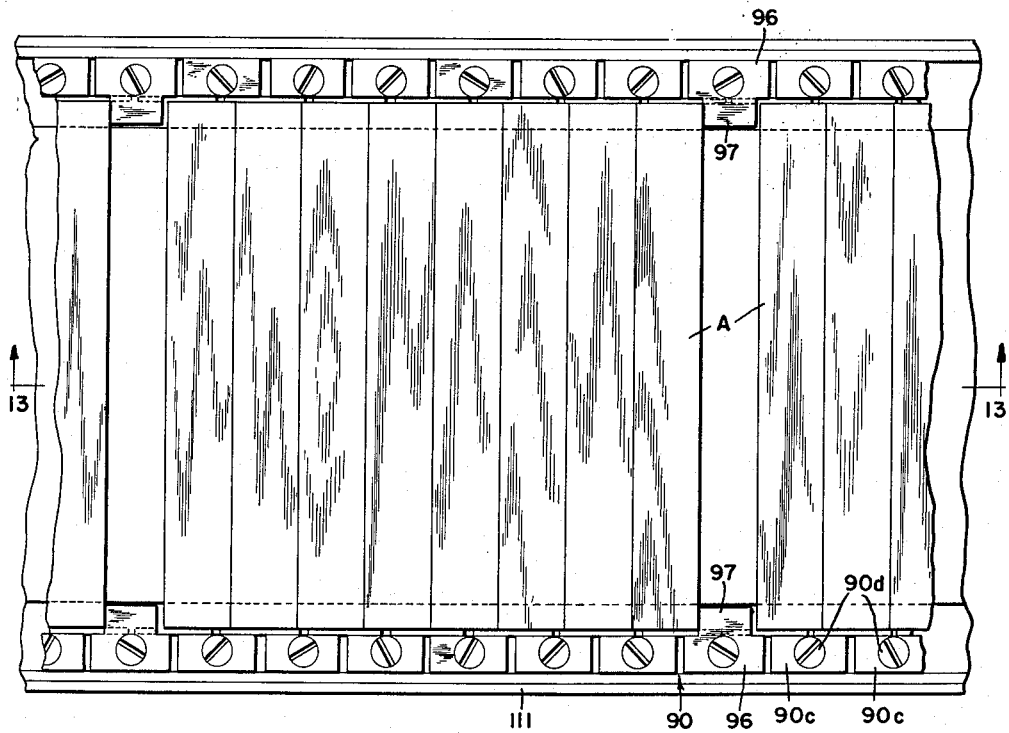
Figure 13:
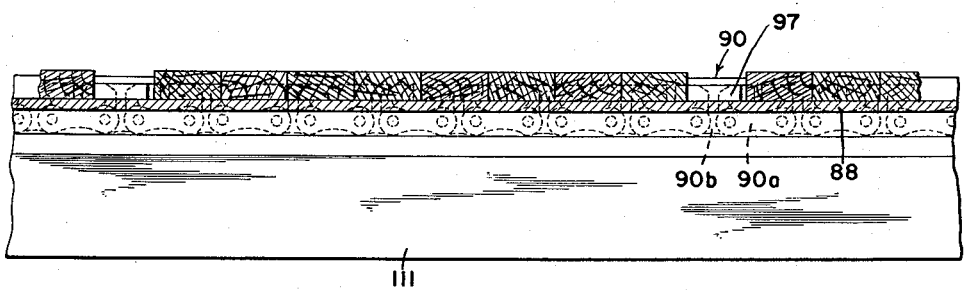

FIGURES 10a and 10b form a composite plan view of the assembly station;

FIGURES 11a and 11b form a composite elevational view of the assembly station shown in FIGURES 10a and 10b;

FIGURE 12 is a fragmentary plan view of the assembly station;

FIGURE 13 is a sectional view taken along the plane 13—13 of FIGURE 12;

FIGURE 14 is a fragmentary sectional view illustrating the assembly of the slats and the continuous web; and FIGURE 15 is a perspective view of a finished block made in accordance with the present invention.

As shown on the drawings:

*General Method*

In FIGURE 1, the entire method and apparatus of the present invention is diagrammatically illustrated.

As indicated thereon, elongated relatively narrow wooden strips of a width and thickness suitable for the formation of rough finished parquet flooring blocks are formed into cut slats of desired size by passing the strips through a gang cutter, preferably of the rotary saw type wherein a plurality of saw blades are disposed upon a common power driven shaft. The strips are of random length, thus permitting the use of otherwise unusable scrap material. The cut slats are then conveyed longitudinally from the slat cutter by means to be hereinafter more fully described to a sorting station at which slats are divided into unassembled block units containing the appropriate number of slats necessary to form a complete flooring block. These unassembled block units are formed by a transversely operating, reciprocating sorting mechanism to be hereinafter described in detail, the block units being conveyed laterally for transfer onto an endless drive chain provided with means for retaining the identity of the individual block units. This drive chain then conveys the blocks longitudinally to an assembly drum.

At the assembly drum, a continuous backing web is pressed into engagement with the slats as the slats are retained against the drum periphery by the drive chain. This backing web has applied thereto an adhesive which contacts the slats. This adhesive has been partially dried prior to contact between the web and the slats, the adhesive being pressure sensitive, so that pressure contact between the web and the slats is sufficient to cause firm adherence between the web and the slats. The utility of the freely rotatable drum to provide a reaction surface against which such pressure contact can be obtained will be readily understood. Further, during travel of the individual rigid slats around the drum periphery, the exposed outer surfaces of the slats become slightly separated, and the slats adhere to the web in this separated pattern. This separation accommodates moisture and thermal expansion and contraction within the individual blocks during use of the flooring units.

After adherence of the slats to the web has been attained, the drive chain is removed from contact with the slats, and the slats are conveyed from the drum, as by tensioning the continuous web, to a position between a pair of separator knives, preferably of the guillotine type, the knives being effective to sever the web intermediate adjacent block units so that individual blocks are formed. These individual block units are subsequently finished by trimming the sides of the block and applying any desired wood finish to the exposed block surface.

Slat Cutting and Conveying Apparatus

As best illustrated in FIGURES 2 to 8, inclusive, the apparatus for conveying the individual slat units from the cutting apparatus to the sorting station comprises a fixed table 20. This table 20 is adapted to receive cut slats from any desired cutting apparatus. The type of slat cutting apparatus schematically illustrated in FIGURE 1 is preferred, although such a cutting apparatus does not form any part of the present invention, and any desired cutter may be utilized.

As best illustrated in FIGURE 5 of the drawings, the individual slats A are retained upon the upper surface of the table 20 in laterally separated relation and in extended surface contact with the table by means of longitudinally extending guide elements 21. These guide elements 21 preferably take the form of T-shaped rails having their central upright legs secured to the table 20, and the upper surfaces of the rails are laterally aligned and adapted to overlie the lateral extremities of the individual slats. The laterally spaced rails serve to form the slats into laterally spaced, parallel columns in which the slats advance from the cutting apparatus to the sorting apparatus.

To drive the slats in column along the table 20, a plurality of endless drive belts 22 are provided, these belts being lapped about idler pulleys 23 disposed upon a common transversely extending shaft 24 overlying the table 20, and about individual drive pulleys 25 drivingly connected to a common driving shaft 26. The driving and driven pulleys 25 and 23, respectively, are each rotatable in a clockwise direction, the driving shaft 26 being driven through a pair of bevel gears 27, 28 from a line shaft 29 which, in turn, is driven through a set of bevel gears 30 and 31 from an input shaft 32. This input shaft 32 had a driven sprocket 33 lapped by a drive chain 34 which also laps a driving sprocket 35. This driving sprocket forms the output member of a speed reduction drive unit 36 driven by a suitable source of power, such as an electric motor 37. The power source 37 is utilized to drive the entire apparatus of the present invention, thus insuring a positive, interlocked drive train effective to correlate the various mechanisms hereinafter disclosed.

The shaft 32 has secured thereto a plurality of driving sprockets 40 (FIGURE 4) lapped by conveyor chains 41, the chains also lapping return or idler sprockets 42 generally underlying the drive pulleys 25 (FIGURE 2). The table 20 terminates slightly beyond the shaft 32, but the elongated T-shaped guides 21 project beyond the table 20.

These guides 21 are supported by suitable framing elements, such as transverse support member 43 on upstanding support posts 44, and the elements 21 are supported at their terminal or free ends remote from the table 20 by a transversely extending upstanding channel 45. This channel 45 is inclined to the horizontal, as best indicated in FIGURE 7, the element 45 sloping downwardly to the right, as viewed in FIGURE 7. The channel 45 is supported from a transverse frame element 46 and vertical posts 47, and forwardly extending side frame elements 48 which also support the bearings 28a for the shaft 26.

The inclination of the plate 45, for a purpose to be hereinafter more fully described in connection with the sorting apparatus, results in the deformation of the T-shaped guide elements 21 so that these elements lie in vertically stepped relation transversely of their length. However, since these elements are interconnected only by the framing elements 43 and 46, this deformation may be readily accommodated. Similarly, the shaft 26 is inclined from the horizontal, but this inclination is so small as to be easily accommodated by the belt and pulley structure without slippage of the belts laterally from the pulleys. Also, the shaft inclination is readily accommodated by the bevel gearset 27, 28.

As best seen in FIGURES 4, 6 and 8, the chains 41 have their upper or driving reaches 41a supported along the upper surfaces of longitudinally extending guide supports 49, these supports being vertically aligned with and underlying the T-shaped slanted guide elements 21. These guide elements 49 terminate in advance of the idler sprockets 42, the free ends of the guide elements being supported by bifurcated idler sprocket brackets 50 (FIGURES 4 and 8).

As best seen in FIGURES 5 and 6, the slats A are initially supported by the table 20. At the free edge of the table 20, the upper or support reaches of the chains 41a lie substantially at the level of the table, and after the slats are conveyed beyond the table, the slats are supported upon the chains 41, more specifically, upon the upper reaches 41a of these chains. The vertical distance between the chain support elements 49 and the T-shaped guide elements 21 is such that the slats are interposed therebetween, as best seen in FIGURE 6, thus retaining the slats against vertical displacement in either direction. Each guide element 21 and each chain 41 supports the adjacent ends of a pair of slats A, the elements 21, chains 41 and chain supports 49 being vertically aligned.

The slats are advanced along the guide elements 21 by contact with the driven belts 22 and also by contact with the chains 41. The slight deformation of the guide elements 21 and of the chain guide elements 49 to accommodate the tilt of the plate 45 can be readily accommodated without causing binding of the slats and without the necessity of warping an elongated guide or table surface, as would be necessary were the table 20 extended longitudinally to the plate 45.

Block Unit Forming Apparatus

After the individual columns of slats have been conducted from the cutting apparatus it is necessary that the slats be subdivided into groups, each containing the number of slats appropriate to form the final discrete parquet blocks. This grouping or compilation of the slats is carried out in the sorting apparatus best illustrated in FIGURES 3–8 of the drawings.

Referring now to FIGURE 8, it will be seen that an apron 51 formed of sheet metal is provided to support the slats and to aid in their removal from the support chains 41. This apron 51 is also seen in FIGURE 4, from which it will be noted that the apron is slotted, as at 52, to accommodate the entry of the chain so that each chain may pass around its idler sprocket 42. It will be noted that the apron 51 lies substantially parallel to the under-guiding surfaces of the associated T-shaped guides 21, so that the apron 51 cooperates with the guides 21 to maintain the columns of slats in their laterally separated, longitudinally aligned positions.

The sorting mechanism is supported upon a pair of transversely spaced support legs 54 and 55, which carry support angles 56, 57, respectively, having their upper surfaces laterally aligned. A reciprocal drive bar 60 (FIGURE 7) is adapted to be driven from the power source 37 through an elongated drive link 62 having one end provided with a clevis 63 connected to a driving stud 64 formed on one of the wear plates 61. The other end of the drive link 62 has its clevis 65 connected to a bell crank indicated generally at 66 and pivotally disposed upon an upright pivot shaft 67 carried by a subframe 68. One end 69 of the bell crank thus is connected to the drive link 62, and the other end 70 of the bell crank 66 is connected to a drive link 71. The bell crank other end or arm 70 is connected through the drive link 71 to a crank portion of the input shaft 32. More specifically, the rod 71 is pivotally connected, as at 73, to crankshaft bearing 72 journalled on an axially offset crank portion 75 of the shaft 32. Rotation of the shaft 32 will thus reciprocate the bell crank 66 and the drive bar 60.

The upper surface of the drive bar 60 is provided with a series of stepped ledge surfaces 76, and secured to these ledge surfaces to project therebeyond longitudinally of the drive bar, but transversely of the guides 21 and the apron 51, are a plurality of push plates 77. These push plates 77 are adapted for reciprocal movement transversely with respect to fixed pan surfaces 78. These pan surfaces 78 lie longitudinally in the plane of the upper surface of the apron 51 and are adapted to receive thereon the slats received from the guide elements 21 and the apron 51. The pans 78 are supported by an end plate 79 carried by the upstanding support elements 54 and 55 and by a transversely extending plate 80 parallel to the plate 79 and also serving to support the bifurcated chain idler brackets 56 heretofore described.

In FIGURE 7, it will be seen that the push plates 77 are adapted to closely underlie the vertically aligned corresponding pans 78 when the drive bar 60 occupies its retracted position as illustrated in FIGURE 7. However, when the drive bar is reciprocated to its forward or extended position, as illustrated in FIGURE 4 of the drawings, the push plates 77 overlie the next adjacent, lower pan 78. This reciprocation of the push plates 77 will effect contact between the push plates and the group of slats occupying the next lower pan, pushing the slats from the one pan onto the next lower pan. The lateral movement of the slats thus occurs under the driving force of the drive bar 60 and the push plate 77 carried thereby; the vertical movement from one pan to the next adjacent lower pan occurs by gravity. Obviously, a group of slats on any given pan will be moved to the next lower adjacent pan upon each reciprocation of drive bar 60. Actually, each push plate 77 moves its appropriate group of slats onto the upper surface of the next lower push plate 77. The subsequent cyclic withdrawal of the lower push plate will deposit this group of slats on the underlying pan 78. The stepped, vertically spaced location of the pans 78 requires the tilt of the plate 45 and the vertical stepping of the guide bars 21.

It will be noted that a pan is provided for each column of slats, an additional pan being provided at the lower end of the group of pans, this pan being designated by the reference numeral 78a (FIGURE 7). The purpose of this pan will be hereinafter more fully explained.

Adjacent the lowermost pan 78a, a subframe 81a supports a fixed transfer pan 81. This transfer pan 81, as best shown in FIGURE 9, is adapted to receive each of the groups of slats formerly occupying the pans 78. More particularly, the transfer pan 81 is adjacent to and adapted to receive slats directly from the lowermost pan 78a upon each reciprocation of the drive bar 60. Extending transversely of the transfer pan in closely spaced relation thereto is a guide angle 82, and interposed between the guide angle 82 and the rearward extension of the pan 81 is a reciprocating transfer plate 83. This plate 83 is thus guided in longitudinal reciprocatory movement to convey slats longitudinally along the surface of the pan 81. As shown in FIGURE 4, the pan 81 is connected through a connecting rod 84 to the crank portion 75 of the shaft 32. Each time the drive bar 60 is actuated to deposit an additional group of slats upon the transfer pan 81, the transfer plate 83 is retracted, and each time the pusher bar 60 is retracted to allow slats to occupy the next lower pan 78, the transfer plate 83 is advanced to move a group of slats across the transfer pan 81.

Also, as shown in FIGURE 9, there is positioned adjacent the transfer pan 81 a pair of laterally spaced drive sprockets 85, the sprockets being journalled in pillow blocks 86 (FIGURE 2) supported on a frame 87, the frame also carrying an upper, planar, horizontal support surface 88. This support surface 88 is deflected downwardly at its rear end, as at 89, to an arcuate contour smoothly blending with that of the root surface of the sprockets 85. The rear edges of the support portion 89 extend into close proximity to the sprocket and serve to guide chains 90 from the periphery of the sprockets 85 onto the upper surface of the support element 88. These chains 90 and the sprockets 85 are spaced laterally through a distance substantially the same as the longitudinal dimension of a slot A, and slats removed from the transfer pan 81 by reciprocation of the transfer plate 83 are moved directly onto the upper exposed surfaces of the chains 90. The chains 90 are driven in synchronism with the movement of the drive bar 60 and the transfer plate 83 by means of a line shaft 91 driven through a bevel gearset 92, including a gear fixedly secured to the shaft 32. The line shaft 91, through a bevel gearset 93 (FIGURE 10a) drives a transverse shaft 94 of a pair of transversely spaced drive sprockets 95 adapted to be lapped by the chains 90.

As best shown in FIGURES 12 and 13, the chains 90 are conventional roller chains having chain links 90a interconnected through chain blocks 90b which carry guide blocks 90c superimposed thereon and secured thereto, as by countersunk screws 90d. Uniformly spaced along the length of each of the chains are driving or lug blocks 96 which have laterally extending projections or lugs 97 which extend inwardly toward one another.

The guide block 90c and the chains 90 carrying these guide blocks are laterally spaced through a distance slightly greater than the longitudinal dimension of the slats A, and the driving lugs 97 project inwardly so as to contact the laterally side surfaces of adjacent slats. The lugs 97 thus drivingly engage the slats and also serve to space the groups of slats A separated and formed by the transversely acting sorting mechanism heretofore described.

Slat Flow Control

To control the flow of slats to the sorting apparatus, through the sorting apparatus and onto the chains, several control devices are provided. In FIGURE 8, a limit switch LS2 is provided for each laterally spaced column of slats, the limit switch LS2 depending adjacent the corresponding belt 22 into contact with the slats conveyed thereby along the guides 21. Overlying the outlet end of each column of slats is a pneumatically actuated cylinder indicated generally at 100. At that pan 78 adjacent the terminal pan 78a there is located a limit switch LS1. A limit switch LS3 is actuated by a cam 52a located on the shaft 32 for actuation when the drive bar 60 is at the end of its extended stroke.

These control devices cooperate in the following manner: When air under pressure is introduced through conduit 101 into the cylinder 100, the cylinder piston 102 is extended into contact with the terminal slat of that column of slats lying between the adjacent and corresponding guide rails 21. It will be noted that the cylinder 100 is pivotally mounted, as at 103, between adjacent longitudinally extending support plates 104, and the cylinder lies against a fixed stop 105 normally retaining the cylinder in its position illustrated in FIGURE 8. Upon extension of the piston 102, the cylinder is free to pivot in a vertical plane to force the slat within which it is in contact rearwardly along the guide rails 21. Obviously, such actuation of the cylinder will prevent the feeding of additional slats to the corresponding pan 78 and rearward movement of the slats give clearance for movement of the slats along the pans 78. Each of the limit switches LS2 is connected in series with the actuation valve (not shown) for the corresponding cylinder 100 and the cylinder will always be actuated in the event that the actuation arm of the limit switch LS2 is allowed to drop, as in the absence of slats in the corresponding slat column. This operation will prevent the feeding of less than a full complement of slats onto the corresponding slat pan 78.

The limit switch LS1 is also connected in series with the actuation valves of the entire series of cylinders 100. So long as slats are present on the pan 78 with which the limit switch LS1 is associated, all the cylinders 100 are actuated and no additional slats will be conveyed to the pans by operation of the belt 22 and the chains 41. Whenever there are no slats upon the pan 78, the limit switch LS1 is released and actuation of the cylinders 100 is interrupted. The cylinders are of the pneumatic-apply, spring-release type and the cutting off of air to the cylinders will cause their spring release, so that belts 22 and chains 41 can now convey slats to the pan 78.

The operation of the cylinders 100 is correlated with movement of the drive bar 60 and the push plates 77 by means of limit switch LS3 so that the cylinders will be moved to their inoperative position of FIGURE 8 only when the drive bar 60 is in its furthest right-hand or extended position of FIGURE 7. The actual movement of the slats onto the pan 78 is thus prevented by the presence of the push plates and upon retraction of the push plates slats will be simultaneously introduced onto the pans from all of those columns in which the limit switch LS2 has not been actuated. This operation is required, since the pusher plates 77 overlie the pans 78 and would prevent the delivery of slats A from the guides 21 to the pans 78. When the drive bar 60 is advanced, as best shown in FIGURE 9, the concave curvature of the support surface or apron 89 of the support surface 88 is effective to spread the drive lugs 97 of the chains 90 to their furthest extent so that additional space is provided between adjacent drive lugs 97 to accommodate the entry of a group of slats from the transfer pan 81. Thus, actuation of the transfer plate 83 will introduce a group of slats onto the chain intermediate successive drive lugs 97, the drive lugs being spread to their greatest extent at the time of actual transfer of the slats to the pan and to the convex support portion 89 of the support surface 88.

The use of the cylinders 100 makes possible the utilization of random length strips. As shown in FIGURE 1, the strips are each bottomed at their left end against a stop, thus more slats will be fed to the left-hand pans 78. However, the limit switches LS2 will prevent the feeding of less than a full complement of slats to the right-hand pans 78. Consequently, slats may not be fed to the pans 78 from the right-hand guide strips 51 upon each actuation of LS1.

Block Unit Assembly Apparatus

The assembly of the completed parquet flooring blocks is carried out by the apparatus illustrated in FIGURES 10a and 11a and 11b.

This apparatus includes the conveying surface 88 which actually is a fixed support surface retained in a substantial horizontal plane above a floor F by upright stanchions or supports 110. This support surface 88 extends laterally between a pair of longitudinally extending, substantially vertical side plates 111, and the chains 90, hereinbefore defined, are adapted for travel along the surface after the individual groups of slats A have been introduced onto chains as hereinbefore explained in detail. The slats propelled by their contact with the driving lugs 97 of the chains 90, the individual groups of slats A being located between adjacent lugs 97.

The support surface 88 also serves as an inspection table. The distance between adjacent chain lugs 97 is slightly greater than the corresponding total dimension of the group of slats. Thus, a slat may be removed from its group and replaced by another slat, if required. Thus, a final quality control can be exercised immediately prior to the assembly of the blocks.

At the terminal end of the substantial horizontal support surface 88, the chains are trained about an idler sprocket 112 which is superimposed over a substantially larger assembly drum which comprises a transversely extending shaft 113, radial spokes 114 and a peripheral supporting surface 115. The periphery of the sprocket 112 is in closely spaced relation to the periphery of the drum 115, there being sufficient space therebetween for the passage of the chains 90 and the slats A carried thereby.

It will be noted from FIGURE 12 that the chain links 90a underlie the slats but are not in actual contact with the slats, since the slats are supported upon the surface 88. The supporting surface 88 is of a lateral extent less than the lateral distance between the links 90a of the two chains 90 and the lugs 97 project laterally sufficiently to engage the slats as they are supported on the surface 88. However, the length of the slats is such that the chains would contact the remote slat ends were it not for the presence of the guide surface 88.

From FIGURES 10a and 11a, it will be noted that a plurality of arcuate rod-like guides 116 are positioned in radially spaced relation to the periphery of the sprockets 112, such arcuate guide bars being contactable with the exposed upper surfaces of the slats to prevent displacement of the slats from the chains during travel of the chains and the slats about the sprocket 112. The chains 90 are trained from the sprocket 112 about the periphery 115 of the assembly drum, the relative vertical positions of the chains and the sprockets being reversed from their positions illustrated in FIGURE 13. This condition is illustrated in FIGURE 14 of the drawings, wherein it will be seen that the chains 90 serve to confine the slats A against the periphery 115 of the drum. Thus, the chains serve to retain the slats A in position against the drum, the under surfaces of the slats being exposed intermediate the chains. From FIGURE 14, it will be noted that the longitudinal upper and lower surfaces of the slats A extend axially of the cylindrical drum, the contacting longitudinal or thickness dimensions of adjacent slats A extend radially of the drum, and each of the groups of slats assume an over-all arcuate configuration conforming to the arcuate periphery 115 of the drum.

As illustrated in FIGURES 11a and 11b, an adhesive backing web 120 is brought into contact with the exposed under surfaces of the slats as the slats are retained against the assembly drum by chains 90. This felt or web 120 is supplied from a roll 121 rotatably disposed upon a shaft 122 supported in a fixed frame 123, the web 120 being drawn from the roll 121 and about a plurality of idler rolls 124 into contact with an adhesive spreader roll 125 positioned over and having its periphery extending into an adhesive receptacle or pan 126. An idler backing roll 127 serves to retain the web against the spreader roll 125. It will be appreciated that liquid adhesive contained within a receptacle 126 will be applied to the under surface of the web 120 as it passes between the nip of the spreader roll 125 and the backing roll 127. The web is inverted by its passage about another idler roll 128 for travel over a plurality of additional idler rolls 129 toward the assembly drum.

The web travels in a substantially horizontal path toward the assembly drum with the adhesive-bearing surface of the web being uppermost. If desired, the adhesive may be partially dried to a suitable tacky condition by one or more heating elements which may take the form of infrared bulbs, air blowers, or the like. The web now passes over a final idler roll 131 in close proximity to the periphery 115 of the assembly drum, the path of the web being such that the idler roll 131 directs the tacky or adhesive-bearing surface of the web against the exposed under surfaces of the slats A, and the width of the web being such that it can be interposed between the laterally spaced chains 90.

The relative positions of the assembly drum periphery 115, the slats A, the chains 90, and the adhesive web 120 can be observed from FIGURE 14 of the drawings.

Due to the convex surface presented by the drum periphery 115, the chains 90 assume a complementary concave configuration, and the driving lugs 97 of the chain, which project radially of the drum, will have their inner or "upper" ends slightly more closely spaced than their outer or "lower" ends. In other words, the inner ends of adjacent lugs 97 will be closer together than the outer ends of adjacent lugs 97. Similarly, the transverse or height dimensions of the slats A will extend radially of the drum and the edges of the formerly "top" surfaces of adjacent slats will be in tight abutment with the edges of the radially outer or formerly "lower" ends of the slats being spaced slightly. Thus, minute V-shaped spaces 132 will occur between adjacent slats. The application of the web to the outer or exposed undersurfaces of the slats, the web being under tension as it is drawn from the supply roll 121, will result in the adherence of adjacent slats to the web in slightly spaced, nonabutting relation. Since the use of wooden slats gives rise to dimensional variations of comparatively great magnitude, the problem of "squareness" in the block assembly becomes important. The use of the radial lugs squares the block and insures accurate alignment of the slats. Further, each block unit is individually squared by its lugs and the tolerance building is limited to the accumulated variations in a small group of slats, namely the number of slats forming each block. Additionally, the provision of the radially extending lugs 97 of the chain 90 will insure tight abutment between adjacent slats at their inner edges or those edges abutting the drum periphery 115.

The driven chain sprockets 95, hereinbefore described as driven from the line shaft 91, are lapped by the chains 90 and are effective to remove the chains from contact with the edges of the slats for return about lower idler sprockets 133 (underlying the drive sprockets 95) and about additional idler sprockets 134 (underlying the sprockets 85) to the hereinbefore described idler sprockets 85. The idler sprockets 134 are preferably journalled on a transverse shaft 135 supported in a carriage 136 guidingly engaged by guide rails 137 so that the weight of the sprockets 134 and shaft 135 will maintain tension in the chain 90.

Intermediate the felt guide roll 131 and the chain drive sprocket 95, a plurality of transversely extending pressure rolls 140 are retained by a pair of transversely spaced arcuate brackets 141. These pressure rolls 140 contact the exposed nonadhesive surface of the web 120 and urge the web to full pressure contact with the exposed surfaces of the slats A.

After withdrawal of the chain 90 from contact with the slats A, the slat-web assembly is removed from contact with the assembly drum periphery 115 by means of a wheel 142 having radially extending arms 143, the ends of which contact the undersurface of the web to aid in stripping the web and the slats associated therewith from the drum periphery. The wheel 142 is disposed upon a central shaft 144 driven from the driven shaft 94 of the sprockets 95 by suitable means, as by a power transmission belt 145. The web and the slats adhered thereto are next fed to a separate knife assembly 150 which includes a pair of separating knives, best seen in FIGURE 1, interposed between longitudinally spaced pairs of drive rolls 151. The specific cutting apparatus 150 forms no part of the present invention, such cutting mechanisms being well known in the art and being generally referred to as "power driven guillotine cutters." The function of the cutting mechanism 150 is to sever the web intermediate the adjacent block assemblies.

Following severing of the web by the cutting mechanism 150, the block may be subjected to conventional trimming and wood finishing processes to form a complete and finished parquet flooring block illustrated in FIGURE 15 of the drawings. This block comprises a plurality of slats A adhesively secured to the backing web 120, the slats being in closely spaced parallel position, the spaces between adjacent slats being sufficient to accommodate the thermal expansion and contraction of the slats during use as a floor covering, the dimensions of the spaces intermediate adjacent slats being such that the application of the finish thereto will bridge the spaces to give the appearance of a unified block.

The web 120 may be of any desired type. One preferred back web is a bibulous paper felt strip impregnated with bituminous or asphaltic material and having applied to the upper surface thereof a pressure sensitive adhesive. Any similar backing material formed of paper, fabric, and/or plastic materials may be utilized if desired.

While a preferred embodiment of my invention has been described above in detail, it will be understood that numerous modifications may be resorted to without departing from the scope of the following claims.

I claim:

1. Apparatus for assembling parquet flooring blocks and the like comprising means for grouping a plurality of elongated slats in parallel aligned relationship, a convex slat supporting surface means for placing said slats in contact with said convex slat supporting surface with the longitudinal edges of said slats extending parallel to the axis of said surface, means for forcing the longitudinal edges of said slats adjacent said surface into abutment with each other while maintaining said slats in contact with said surface, means for applying a common retaining element to the surface of said slats opposed to the surfaces in contact with said convex surface, and means for subsequently removing the assembled blocks from said convex surface.

2. Apparatus for assembling parquet flooring blocks as defined in claim 1 wherein said convex slat supporting surface is the outer surface of a freely rotatably cylinder.

3. Apparatus for assembling parquet flooring blocks as defined in claim 1 wherein said convex surface is the outer surface of a freely rotatable cylinder, and wherein said apparatus further includes a first longitudinal conveyor adapted to convey said slats in a direction normal to the length thereof and in advance of said means for placing said slats in contact with said convex surface on said freely rotatable cylinder, and means for transferring a predetermined number of slats forming a block unit from said first longitudinal conveyor to said means for placing said block in contact with said convex surface.

4. In an apparatus for assembling parquet flooring units or the like from individual elongated slats, an endless chain, means for driving the chain, spaced lugs on the chain projecting normally to the path of travel of the chain, guide means for the chain including means defining a convex chain path portion and means defining a concave chain path portion sequentially traversed by the chain, means at the convex portion for depositing a group of slats between adjacent lugs, and means at the concave portion for guiding a securing element into contact with the group of slats.

5. In an apparatus for securing a plurality of individual slats into a flooring block, a pair of laterally spaced parallel conveyor chains, upstanding lugs on said chains at longitudinally spaced transversely aligned locations, a convex supporting surface for said chains, the passage of said chains over said convex surface separating said lugs longitudinally, means for introducing a plurality of slats onto said chains intermediate adjacent lugs as separated by passage over said convex surface, said lugs separating the slats into block units, an assembly support having an arcuate peripheral surface lapped by said chains and contacting the block units carried thereby, the chains assuming a concave configuration to urge the block units against the support surface with the chain lugs urging the edges of the support-contacting slat surfaces into snug abutment and accommodating peripheral separation of the edges of the non-support-contacting slat surfaces, and means urging a securing element into contact with the non-support contacting slat surfaces intermediate the chains.

6. In an apparatus for securing a plurality of individual slats into a flooring block, a pair of laterally spaced parallel conveyor chains, upstanding lugs on said chains at longitudinally spaced transversely aligned locations, said lugs separating the slats into block units, an assembly member having an arcuate peripheral surface lapped by said chains and contacting the block units carried thereby, the chains assuming a concave configuration to urge the block units against said assembly member surface with the chain lugs urging the edges of the assembly member-contacting slat surfaces into snug abutment and accommodating peripheral separation of the edges of the non-assembly member contacting slat surfaces, and means urging a retaining element into contact with said non-assembly member contacting slat surfaces intermediate the chains.

7. Apparatus for assembling parquet flooring units or the like comprising a feed conveyor including a pair of transversely spaced chains, a series of transversely spaced and aligned lugs on each of said chains, means on said chains for supporting a plurality of blocks between said chains, a convex forming surface, means guiding said chains circumferentially along the outer surface of said forming surface with said lugs projecting from said chains toward said forming surface, the spacing between said lugs being related to the dimensions of said blocks and said forming surface to cause said lugs to move the edges of said blocks adjacent said forming surface and parallel to the axis thereof into contact with each other and to separate the edges of said blocks remote from said forming surface, and guide means for guiding an adhesive web into contact with the blocks.

8. Apparatus for assembling individual slats into parquet flooring units or the like comprising laterally spaced guide elements for guiding slats longitudinally in column in a direction normal to the longitudinal slat dimension, conveyor means for contacting slats on said guide means to advance the slats therealong, a transversely disposed shuttle conveyor adapted to receive slats from said guide means and to convey composite groups of slats in a direction transverse to said guide means, a feed conveyor including a pair of transversely spaced chains extending longitudinally and generally parallel to said guide means, a series of transversely spaced and aligned lugs on each of said chains, means on said chains for supporting a group of slats between said chains, transfer means for transferring a group of slats from said shuttle conveyor to said feed conveyor, a rotatable forming drum, means guiding said chains circumferentially along the outer surface of said drum with said lugs projecting from said chains toward said drum, the spacing between said lugs being related to the dimensions of said slats and said drum to cause said lugs to move the edges of said slats adjacent said drum and parallel to the axis thereof into contact with each other and to separate the edges of said slats remote from said drum, and means for guiding a securing element into contact with said slats.

9. In an apparatus for making discrete flooring blocks from a plurality of individual wooden slats, means for grouping a predetermined number of rigid slats required to form a block, flexible means for retaining said slats in face abutment with an arcuate forming surface and having lugs extending radially of said surface, said lugs forcing those surfaces of said slats abutting said forming surface into a substantially continuous surface of a contour conforming substantially to that of said surface, and said lugs accommodating the formation of a discontinuous surface by those slat surfaces remote from and substantially parallel to said forming surface with those slat edges extending axially of said arcuate surface being spaced circumferentially of said surface, means guiding a pressure-sensitive adhesive bearing continuous backing web into contact with said remote slat surfaces, and pressure means urging said web into adhesive contact with said surface.

10. An apparatus for assembling parquet flooring units or the like from individual slats of generally flat elongated shape comprising sorting means for assembling a plurality of said blocks into unit groups with the narrower longitudinal side surfaces of said slats of each group in parallel opposed relationship, a conveyor chain for supporting the slats of each of said groups and having separator blocks adapted to be interposed between adjacent groups of slats, transfer means for conveying successive groups of slats to said chain, an assembly member having a peripheral convex surface partially lapped by said chain and adapted to be contacted by the slats of each group, those edges of the slats of each group remote from the member being separated peripherally of said member, means guiding an adhesive backing web into contact with the slats of each group, and means for successively stripping the chain and the slat-web assembly from the member.

11. An apparatus for making discrete flooring blocks from a plurality of individual flooring slats, comprising a first longitudinal conveyor adapted to convey slats in a direction normal to the length thereof, a shuttle conveyor operable in a direction transverse to that of the first conveyor and including a plurality of pans each adapted to receive a predetermined number of slats forming a block unit and means for simultaneously laterally advancing a plurality of block units, a flexible longitudinal conveyor for conveying block units in a direction normal to the lengths of the slats thereof, a reciprocal shuttle plate actuatable in the plane of movement of the flexible conveyor for transferring block units from the shuttle conveyor to the second conveyor, means at the point of transfer from said shuttle conveyor to said flexible conveyor for deforming said flexible conveyor to a convex configuration, means for subsequently deforming said flexible conveyor into a concave configuration, and means for guiding a securing element into contact with the slats of said block units as the block units assume the concave configuration of said flexible conveyor.

12. In an apparatus for making discrete flooring blocks from a plurality of individual flooring slats, comprising a first longitudinal conveyor adapted to convey slats in a direction normal to the length thereof, a shuttle conveyor operable in a direction transverse to that of the first conveyor and including a plurality of transversely aligned pans each adapted to receive a predetermined number of slats forming a block unit, means for simultaneously introducing slats onto all of said pans, reciprocal means for successively laterally advancing block units from said pans to a transfer station, a flexible longitudinal conveyor for conveying block units in a direction normal to the lengths of the slats thereof, a reciprocal shuttle plate actuatable in the plane of movement of the second conveyor for transferring block units from the transfer station to said flexible conveyor, said flexible conveyor having spaced lugs projecting normally to the path of travel thereof, and means located at the transfer station for deforming the flexible conveyor to a convex configuration, thereby increasing the distance between adjacent lugs and facilitating the transfer of slats from the shuttle conveyor.

13. In an apparatus for securing a plurality of individual slats into a flooring block, a longitudinal conveyor adapted to convey slats in a direction normal to the length thereof, a shuttle conveyor operable in a direction transverse to that of the first conveyor and including a plurarality of pans each adapted to receive a predetermined number of slats forming a block unit and means for simultaneously laterally advancing a plurality of block units, a pair of laterally spaced parallel conveyor chains, a reciprocal shuttle plate actuatable in the plane of movement of the chains for transferring block units from the shuttle conveyor to the chains, upstanding lugs on said chains at longitudinally spaced transversely aligned locations said lugs separating the slats into block units, an assembly drum having an arcuate peripheral surface lapped by said chains and contacting the block units carried thereby, the chains assuming a concave configuration to urge the block units against the drum surface with the chain lugs urging the edges of the drum-contacting slat surfaces into snug abutment and accommodating peripheral separation of the edges of the nondrum-contacting slat surfaces, and means urging an adhesive continuous web into contact with the nondrum-contacting salt surfaces intermediate the chains.

14. In an apparatus for securing a plurality of individual slats into a flooring block, means for conveying slats in a direction normal to the length thereof, means for separating a predetermined number of slats forming a block unit, means for simultaneously laterally advancing a plurality of block units, a conveyor, means for transferring the block units to said conveyor, means for maintaining the units on said conveyor in separately sequentially advanced order, means for deforming the conveyor into a concave configuration to accommodate the separation of the edge of the conveyor-adjacent surfaces of said slats and to urge other edges of said slats into snug abutment, and means for urging a continuous securing element into contact with said conveyor-adjacent surfaces of said slats.

References Cited in the file of this patent

UNITED STATES PATENTS

| | | |
|---|---|---|
| 691,261 | Graham | Jan. 14, 1902 |
| 1,315,166 | Semashko | Sept. 2, 1919 |
| 1,315,167 | Semashko | Sept. 2, 1919 |
| 1,828,013 | Yingling | Oct. 20, 1931 |
| 1,939,157 | Yingling | Dec. 12, 1933 |
| 1,948,087 | Aberson | Feb. 20, 1934 |
| 2,399,124 | Kahr | Apr. 23, 1946 |
| 2,678,896 | Dratler | May 18, 1954 |
| 2,713,380 | Baumann | July 15, 1955 |
| 2,828,794 | Baumann | Apr. 1, 1958 |

FOREIGN PATENTS

| | | |
|---|---|---|
| 71,630 | Denmark | Oct. 23, 1950 |

UNITED STATES PATENT OFFICE
CERTIFICATE OF CORRECTION

Patent No. 3,118,804 January 21, 1964

Charles E. Tibbals

It is hereby certified that error appears in the above numbered patent requiring correction and that the said Letters Patent should read as corrected below.

Column 10, line 44, after "surface" insert a comma; line 57, for "rotatably" read -- rotatable --.

Signed and sealed this 26th day of May 1964.

(SEAL)
Attest:

ERNEST W. SWIDER
Attesting Officer

EDWARD J. BRENNER
Commissioner of Patents

Disclaimer 3,118,804.—*Charles E. Tibbals*, Oneida, Tenn. APPARATUS FOR MAKING PARQUET FLOORING BLOCKS. Patent dated Jan. 21, 1964. Disclaimer filed Feb. 14, 1964, by the assignee, *Wood Products Development Co., Inc.*, the inventor consenting.

Hereby enter this disclaimer to claim 1 of said patent.

[*Official Gazette June 2, 1964.*]

Disclaimer 3,118,804.—*Charles E. Tibbals*, Oneida, Tenn. APPARATUS FOR MAKING PARQUET FLOORING BLOCKS. Patent dated Jan. 21, 1964. Disclaimer filed Feb. 2, 1970, by the assignee, *Wood Products Development Company*.

Hereby enters this disclaimer to claims 2 and 3 of said patent.
[*Official Gazette May 26, 1970.*]